United States Patent [19]

Yamazaki et al.

[11] Patent Number: 5,853,468
[45] Date of Patent: Dec. 29, 1998

[54] WATER-BASED INK COMPOSITION AND INK-JET RECORDING PROCESS EMPLOYING THE SAME

[75] Inventors: Hideto Yamazaki; Masaya Fujioka, both of Nagoya; Shunichi Higashiyama, Yotsukaichi, all of Japan

[73] Assignee: Brother Kogyo Kabushiki Kaisha, Nagoya, Japan

[21] Appl. No.: 743,727

[22] Filed: Nov. 6, 1996

[30] Foreign Application Priority Data

Nov. 13, 1995 [JP] Japan ................................ 7-319558
Nov. 13, 1995 [JP] Japan ................................ 7-319559
Nov. 13, 1995 [JP] Japan ................................ 7-319560

[51] Int. Cl.⁶ .................................................. C09D 11/02
[52] U.S. Cl. .................................. 106/31.43; 106/31.57
[58] Field of Search ........................... 106/31.43, 31.57, 106/31.27

[56] References Cited

U.S. PATENT DOCUMENTS 5,016,028  5/1991  Temple .............................. 346/140 R
5,078,790  1/1992  Tochihara et al. ................... 106/31.43
5,100,469  3/1992  Pontes et al. ...................... 106/31.43
5,356,464  10/1994  Hickman et al. .................... 106/31.58

FOREIGN PATENT DOCUMENTS

A-64-6074    1/1989  Japan .
A-1-204979   8/1989  Japan .
A-2-150355   6/1990  Japan .
A-5-125306   5/1993  Japan .

*Primary Examiner*—Helene Klemanski
*Attorney, Agent, or Firm*—Oliff & Berridge, PLC

[57] ABSTRACT

A water-based ink composition having an aqueous medium, a dye dissolved therein, and a pH adjuster. The pH adjuster may be any one of the following (1) to (4):

(1) triethanolamine and triethanolamine hydrochloride;
(2) triethanolamine and hydrochloric acid;
(3) tris (hydroxymethyl) aminomethane and tris (hydroxymethyl) aminomethane hydrochloride; and
(4) tris (hydroxymethyl) aminomethane and hydrochloric acid; and is used to adjust the pH of the water-based ink composition to a value within the range of from 8 to 10.

16 Claims, No Drawings

WATER-BASED INK COMPOSITION AND INK-JET RECORDING PROCESS EMPLOYING THE SAME

BACKGROUND OF THE INVENTION

1. Field of the Invention

This invention relates to a water-based ink composition suited for ink-jet recording, and an ink-jet recording process making use of it.

2. Description of the Related Art

Ink-jet recording is a system in which ink droplets are formed by ink ejection methods of various types (e.g., a system utilizing electrostatic attraction, a system in which mechanical vibration or displacement is imparted to ink by the use of a piezoelectric device, and a system in which ink is heated to cause it to bubble and a pressure produced when it bubbles is utilized), and part or the whole of them is caused to adhere to recording mediums such as paper to make a record.

As ink compositions used in such ink-jet recording systems, those prepared by dissolving or dispersing various color-forming water-soluble dyes or pigments in water or mixed solvents of water and water-soluble organic solvents are known in the art.

Ink compositions for ink-jet recording are required to have various performances such that they cause no clogging at nozzles and in ink channels of the head of a recording apparatus, cause no changes in properties and no deposition of solid matter during their storage, give recorded images having sharp color tones and sufficiently high densities, enable recording without limitation on the type of recording mediums, have a high rate of fixing to recording mediums, having excellent water resistance, light fastness, solvent resistance and abrasion resistance, give recorded images having a good resolution, and have values of physical properties such as viscosity and surface tension within proper ranges. In particular, what is important is the liquid stability that the ink does not cause clogging of, and deposits at, nozzles and ink channels of the recording apparatus.

Pigment ink compositions have a superior weatherability, but have a poor liquid stability since the pigment is dispersed in a solvent. During their storage for a long period of time, the dispersion of pigment may become unstable to cause agglomeration. Hence, they tend to cause clogging at the head nozzles or the like of the ink-jet recording apparatus. Accordingly, it is attempted to make improvement by regulating the constitution of pigment ink compositions as disclosed in Japanese Patent Application Laid-open No. 1-204979, or by controlling the pH of water-based pigment ink compositions as disclosed in Japanese Patent Application Laid-open Nos.64-6074 and 5-125306. They, however, can not endure the use as ink-jet recording inks.

Dye ink compositions, though having weatherability inferior to the pigment ink compositions, do not tend to cause clogging at nozzles and in ink channels of the head of the recording apparatus, and are widely used as ink-jet recording inks.

Many of such dye ink compositions are available as water-based ink compositions prepared by dissolving water-soluble dyes having various chemical structures, in water or mixed solvents of water and water-soluble organic solvents.

Such water-based dye ink compositions may cause a decrease in solubility of dyes to cause deposits of dyes, when the quality of liquid is nearly neutral or acidic. On the other hand, when strongly alkaline, they may cause deformation of members used in the ink-jet recording apparatus, in particular, members made of organic materials, or the organic materials constituting the members may dissolve into the ink, undesirably. They may also be harmful to human bodies, e.g., may attack the cornea, and hence, in order to adjust the pH of inks to the weakly alkaline side, some of them employ pH adjusters such as inorganic salts such as KOH and NaOH or inorganic salt components having a buffer action.

However, such water-based dye ink compositions containing inorganic salts tend to cause the inorganic salt components to deposit at the head nozzles of the ink-jet recording apparatus, to cause clogging. When the ink compositions are used over a long period of time, the addition of the pH adjuster becomes less effective, so that the pH may become lower and the dye may become deposited to make the liquid stability poor.

SUMMARY OF THE INVENTION

The present invention was made in order to solve the problems stated above. An object of the present invention is to provide a water-based ink composition having a superior liquid stability and may cause no clogging or the like, and an ink-jet recording process making use of such an ink composition.

The above object can be achieved by the invention described below.

The present invention provides a water-based ink composition comprising an aqueous medium, a dye dissolved therein, and a pH adjuster; wherein the pH adjuster comprises any one of the following (1) to (5):

(1) triethanolamine and triethanolamine hydrochloride;
(2) triethanolamine and hydrochloric acid;
(3) tris(hydroxymethyl)aminomethane;
(4) tris(hydroxymethyl)aminomethane and tris(hydroxymethyl)aminomethane hydrochloride; and
(5) tris(hydroxymethyl)aminomethane and hydrochloric acid; and the pH of the water-based ink composition is adjusted to a value within the range of from 8 to 10.

The present invention also provides an ink-jet recording process carried out by jetting an ink composition to a recording medium in the form of droplets to make a record, wherein;

the ink composition comprises a water-based ink composition comprising an aqueous medium, a dye dissolved therein, and a pH adjuster; wherein the pH adjuster comprises any one of the following (1) to (5):

(1) triethanolamine and triethanolamine hydrochloride;
(2) triethanolamine and hydrochloric acid;
(3) tris(hydroxymethyl)aminomethane;
(4) tris(hydroxymethyl)aminomethane and tris(hydroxymethyl)aminomethane hydrochloride; and
(5) tris(hydroxymethyl)aminomethane and hydrochloric acid; and the pH of the water-based ink composition is adjusted to a value within the range of from 8 to 10.

These and other objects, features and advantages of the present invention are described in or will become apparent from the following detailed description of the preferred embodiments.

DESCRIPTION OF THE PREFERRED EMBODIMENTS

The water-based ink composition of the present invention basically comprises an aqueous medium, a dye dissolved therein and a specific pH adjuster.

As the dye used in the present invention, there are no particular limitations thereon so long as it is a water-soluble dye. It may include, e.g., direct dyes, acid dyes, basic dyes and reactive dyes. In particular, as those preferable for ink compositions used in the ink-jet and satisfying sharpness, water-solubility, stability, light-fastness and other required performances, the dye may include the following.

C.I. Direct Black 17, 19, 32, 51, 71, 108, 146, 154, 168; C.I. Direct Blue 6, 22, 25, 71, 86, 90, 106, 199; C.I. Direct Red 1, 4, 17, 28, 83, 227; C.I. Direct Yellow 12, 24, 26, 86, 98, 142; C.I. Direct Orange 34, 39, 44, 46, 60; C.I. Direct Violet 47, 48; C.I. Direct Brown 109; C.I. Direct Green 59; C.I. Acid Black 2, 7, 24, 26, 31, 52, 63, 112, 118; C.I. Acid Blue 9, 22, 40, 59, 93, 102, 104, 117, 120, 167, 229, 234; C.I. Acid Red 1, 6, 32, 37, 51, 52, 80, 85, 87, 92, 94, 115, 180, 249, 256, 289, 315, 317; C.I. Acid Yellow 11, 17, 23, 25, 29, 42, 61, 71; C.I. Acid Orange 7, 19; C.I. Acid Violet 49; and C.I. Food Black 1, 2.

The above dye may preferably be contained in an amount not less than 0.1% by weight based on the total weight of the water-based ink composition to be obtained. If it is in an amount less than 0.1% by weight, images recorded on recording mediums can not have a sufficient density and a sharpness in color tone.

In conventional ink compositions, water-soluble dyes are commonly used in an amount of 0.1 to 10% by weight based on the total weight of the ink composition. However, in the water-based ink composition of the present invention, even when the dye is used in an amount more than 10% by weight, the water-based ink composition obtained can have a superior liquid stability and may cause no deposits.

The aqueous medium used in the present invention is water, or a mixed solvent of water and a water-soluble organic solvent.

As the water, it is preferable to use not commonly available water containing various ions, but deionized water.

In the mixed solvent of water and a water-soluble organic solvent, the water-soluble organic solvent is used for the purpose of preventing ink from drying.

The water-soluble organic solvent may be contained in the ink composition in an amount of usually from 0 to 95% by weight, preferably from 10 to 80% by weight, and more preferably from 10 to 50% by weight, based on the total weight of the ink composition. When this water-soluble organic solvent is used, the content of the water may be determined within a vast range, depending on the type of component of the water-soluble organic solvent, the composition thereof and the desired properties of ink, and may be within the range of usually from 10 to 95% by weight, preferably from 10 to 70% by weight, and more preferably from 20 to 70% by weight, based on the total weight of the ink composition.

There are no particular limitations on the above water-soluble organic solvent. It may include, e.g., lower alcohols such as methyl alcohol, ethyl alcohol, n-propyl alcohol, isopropyl alcohol, n-butyl alcohol, sec-butyl alcohol and tert-butyl alcohol; amides such as dimethylformamide and dimethylacetamide; ketones such as acetone; ketoalcohols such as diacetone alcohol; ethers such as tetrahydrofuran and dioxane; polyalkylene glycols such as polyethylene glycol and polypropylene glycol; alkylene glycols such as ethylene glycol, propylene glycol, butylene glycol, diethylene glycol, triethylene glycol, dipropylene glycol, tripropylene glycol, thiodiglycol and hexylene glycol; lower alkyl ethers of polyhydric alcohols, such as ethylene glycol monomethyl ether, ethylene glycol monoethyl ether, diethylene glycol monomethyl ether, diethylene glycol monoethyl ether, diethylene glycol monobutyl ether, triethylene glycol monomethyl ether, triethylene glycol monoethyl ether, and triethylene glycol monobutyl ether; glycerol; 2-pyrrolidone; N-methyl-2-pyrrolidone; and 1,3-dimethyl-2-imidazolidinone.

The water-based ink composition of the present invention has a pH of from 8 to 10. If its pH is lower than 8, the dye tends to become deposited when the ink composition is stored for a long period of time, to cause clogging at nozzles and in ink channels of the head of the recording apparatus. If the pH is higher than 10, the ink may cause deformation of members used in the ink-jet recording apparatus, in particular, members made of organic materials, or the organic materials constituting the members may dissolve into the ink. Also, since the ink is strongly alkaline, it may be harmful to human bodies. Hence, the pH is limited to the above range.

In the present invention, to the water-based ink composition described above, various conventionally known additives may be optionally added, as exemplified by a variety of cationic, anionic or nonionic surface active agents, viscosity modifiers such as polyvinyl alcohol, celluloses and water-soluble resins, surface tension modifiers, and antifungal agents. When an ink composition is prepared which is used in an ink-jet recording process of the type a recording solution is electrically charged, a specific resistance modifier including inorganic salts such as ammonium chloride may be added.

The water-based ink composition of the present invention can be produced by any conventional methods. For example, the dye, the aqueous medium and the pH adjuster are thoroughly mixed with stirring, followed by filtering.

The pH adjuster used in the present invention is any one of the following (1) to (5):

(1) triethanolamine and triethanolamine hydrochloride;
(2) triethanolamine and hydrochloric acid;
(3) tris(hydroxymethyl)aminomethane;
(4) tris(hydroxymethyl)aminomethane and tris(hydroxymethyl)aminomethane hydrochloride; and
(5) tris(hydroxymethyl)aminomethane and hydrochloric acid.

The amount of the component in these pH adjusters may be appropriately determined depending on the desired pH value and the acidity of the dye used.

Here, the above triethanolamine makes alkaline the quality of liquid of the aqueous medium described above, and is effective for making the dye readily soluble. When the triethanolamine has a pKa (−log, acid dissociation constant) of 7.76 and is used in combination with the triethanolamine hydrochloride or the hydrochloric acid, a sufficient buffer action can be obtained at the pH of 8 to 9. Thus, so long as the pH of the water-based ink composition is adjusted to 8 to 10, the pH of the water-based ink composition does not becomes lower than 8 when the ink composition undergoes any subsequent changes with time, so that the problems such as deposition of dyes do not occur even after long-term storage of the ink composition.

The triethanolamine is liquid at room temperature. Hence, different from inorganic salts which are pH adjusters commonly used, the water-based ink composition obtained does not solidify at the head nozzles when used in an ink-jet recording apparatus to record images, and may cause clogging with difficulty.

The tris(hydroxymethyl)aminomethane is also different from inorganic salts which are pH adjusters commonly used, and the water-based ink composition obtained does not solidify at the head nozzles when used in an ink-jet recording apparatus to record images, and may cause clogging with difficulty. The tris(hydroxymethyl)aminomethane also makes alkaline the quality of liquid of the aqueous medium described above, and is effective for making the dye readily soluble. When the tris(hydroxymethyl)aminomethane has a pKa (−log, acid dissociation constant) of 7.70 and is used in combination with the tris(hydroxymethyl)aminomethane hydrochloride or the hydrochloric acid, a sufficient buffer action can be obtained at the pH of 8 to 9. Thus, so long as the pH of the water-based ink composition is adjusted to 8 to 10, the pH of the water-based ink composition does not becomes lower than 8 when the ink composition undergoes any subsequent changes with time, so that the problems such as deposition of dyes do not occur even after long-term storage of the ink composition.

The water-based ink composition of the present invention, obtained in the manner as described above, has well solved the problems involved in the prior art, and for itself has well balanced performances in respect of all of recording performances in ink-jet recording (e.g., signal response, stability in droplet formation, ejection stability, long-time continuous recording performance, and ink ejection stability after long-time pause), storage stability, fixing performance to recording mediums, recorded image light-fastness, water resistance and so forth, and can be useful as ink compositions for ink-jet recording of various systems. Hence, an ink-jet recording process carried out using the water-based ink composition of the present invention by jetting it to a recording medium (e.g., plain paper, coated paper, transparent film) in the form of droplets to make a record is embraced in the present invention as part thereof. In particular, the ink-jet recording process of the present invention can be preferably applied in the ink-jet recording system in which the water-based ink composition is jetted in the form of droplets by utilizing the vibration of a piezoelectric device and also in the ink-jet recording system in which the water-based ink composition is jetted in the form of droplets by utilizing the action of heat energy, the latter being easily affected by the formation of deposits. Thus, the process does not cause clogging at nozzles and in ink channels of the head of the recording apparatus, and also can form good recorded images.

EXAMPLES

The present invention will be described below in greater detail by giving Examples. The present invention is by no means limited to the following Examples only.

In the following Examples and the comparative Examples, yellow ink compositions obtained were examined on the following tests (T1) to (T3).

(T1) Long-term stability

The ink compositions were hermetically enclosed in a heat-resistant glass bottle, and stored at −30° C. or 60° C. for 6 months.

(T2) Ejection stability

Using the shear mode type ink-jet recording head disclosed in Japanese Patent Application Laid-open No. 2-150355, the ink compositions were continuously ejected in an atmosphere of 5° C., 20° C. or 40° C., for 24 hours for each.

(T3) Ejection response

Using the shear mode type ink-jet recording head disclosed in Japanese Patent Application Laid-open No. 2-150355, intermittent ejection at intervals of 1 minute and ejection after leaving for 2 months were examined.

Example 1

To 73 parts by weight of pure water, 1 part by weight of triethanolamine, 4 parts by weight of a 0.12N aqueous HCl solution, 2 parts by weight of a yellow dye DAIWA IJ YELLOW 205H (trade name; available from Daiwa Chemical Co., Ltd.) and 20 parts by weight of ethylene glycol were added, and the mixture was stirred for 30 minutes, followed by filtration with a membrane filter of 0.7 μm in pore diameter to obtain a yellow ink composition. The pH of this yellow ink composition was measured to find that it was 8.93.

This yellow ink composition was examined on the tests (T1) to (T3), and good results were obtained in all items as below.

(T1) Long-term stability: Even after such storage, deposition of insoluble matter was not seen, and changes in liquid properties (pH was 8.90 after the storage at −30° C. and 8.83 at 60° C.) and color tone were also little seen.

(T2) Ejection stability: Always stable, high-quality recording was performed in all atmospheres.

(T3) Ejection response: In both instances, no clogging occurred at the nozzles or ink channels of the ink-jet recording apparatus head, and stable and uniform recording was performed.

Example 2

To 67.4 parts by weight of pure water, 0.6 part by weight of triethanolamine, 10 parts by weight of a 0.12N aqueous HCl solution, 2 parts by weight of a yellow dye DAIWA IJ YELLOW 205H (trade name; available from Daiwa Chemical Co., Ltd.) and 20 parts by weight of ethylene glycol were added, and a yellow ink composition was obtained in the same manner as in Example 1. The pH of this yellow ink composition was measured to find that it was 8.12.

This yellow ink composition was examined on the tests (T1) to (T3), and the same good results as in Example 1 were obtained in all items. In the evaluation of long-term stability in (T1), the pH was 8.11 after the storage at −30° C. and 8.03 at 60° C.

Example 3

To 77.2 parts by weight of pure water, 0.61 part by weight of triethanolamine, 0.19 parts by weight of triethanolamine hydrochloride, 2 parts by weight of a yellow dye DAIWA IJ YELLOW 205H (trade name; available from Daiwa Chemical Co., Ltd.) and 20 parts by weight of ethylene glycol were added, and a yellow ink composition was obtained in the same manner as in Example 1. The pH of this yellow ink composition was measured to find that it was 8.40.

This yellow ink composition was examined on the tests (T1) to (T3), and the same good results as in Example 1 were obtained in all items. In the evaluation of long-term stability in (T1), the pH was 8.35 after the storage at −30° C. and 8.29 at 60° C.

Example 4

To 77.92 parts by weight of pure water, 0.08 part by weight of tris(hydroxymethyl)aminomethane, 2 parts by weight of a yellow dye DAIWA IJ YELLOW 205H (trade name; available from Daiwa Chemical Co., Ltd.) and 20 parts by weight of ethylene glycol were added, and the mixture was stirred for 30 minutes, followed by filtration with a membrane filter of 0.7 μm in pore diameter to obtain a yellow ink composition. The pH of this yellow ink composition was measured to find that it was 8.80.

This yellow ink composition was examined on the tests (T1) to (T3), and good results were obtained in all items as below.

(T1) Long-term stability: Even after such storage, deposition of insoluble matter was not seen. As to liquid properties, the pH was 8.70 after the storage at −30° C. and lowered to 8.50 after the storage at 60° C., but changes were little seen in viscosity, surface tension, conductivity, density and so forth.

(T2) Ejection stability: Always stable, high-quality recording was performed in all atmospheres.

(T3) Ejection response: In both instances, no clogging occurred at the nozzles or ink channels of the ink-jet recording apparatus head, and stable and uniform recording was performed.

Example 5

To 77.96 parts by weight of pure water, 0.04 part by weight of tris(hydroxymethyl)aminomethane, 2 parts by weight of a yellow dye DAIWA IJ YELLOW 205H (trade name; available from Daiwa Chemical Co., Ltd.) and 20 parts by weight of ethylene glycol were added, and a yellow ink composition was obtained in the same manner as in Example 4. The pH of this yellow ink composition was measured to find that it was 8.30.

This yellow ink composition was examined on the tests (T1) to (T3), and the same good results as in Example 4 were obtained. In the evaluation of long-term stability in (T1), the pH was 8.15 after the storage at −30° C. and 8.05 at 60° C.

Example 6

To 21.81 parts by weight of pure water, 0.05 part by weight of tris(hydroxymethyl)aminomethane, 58.14 parts by weight (dye concentration: 2.5%) of a yellow dye solution PRO JET FAST YELLOW 2 (trade name; available from Geneca Co.; an aqueous solution with a dye concentration of 4.3%) and 20 parts by weight of ethylene glycol were added, and a yellow ink composition was obtained in the same manner as in Example 4. The pH of this yellow ink composition was measured to find that it was 8.70.

This yellow ink composition was examined on the tests (T1) to (T3), and the same good results as in Example 4 were obtained. In the evaluation of long-term stability in (T1), the pH was 8.58 after the storage at −30° C. and 8.40 at 60° C.

Example 7

To 21.85 parts by weight of pure water, 0.01 part by weight of tris(hydroxymethyl)aminomethane, 58.14 parts by weight (dye concentration: 2.5%) of a yellow dye solution PRO JET FAST YELLOW 2 (trade name; available from Geneca Co.; an aqueous solution with a dye concentration of 4.3%) and 20 parts by weight of ethylene glycol were added, and a yellow ink composition was obtained in the same manner as in Example 4. The pH of this yellow ink composition was measured to find that it was 8.40.

This yellow ink composition was examined on the tests (Tl) to (T3), and the same good results as in Example 4 were obtained. In the evaluation of long-term stability in (T1), the pH was 8.33 after the storage at −30° C. and 8.06 at 60° C.

Example 8

To 78.44 parts by weight of pure water, 0.06 part by weight of tris(hydroxymethyl)aminomethane, 1.5 parts by weight of a magenta dye DAIWA IJ RED 319H (trade name; available from Daiwa Chemical Co., Ltd.) and 20 parts by weight of ethylene glycol were added, and a magenta ink composition was obtained in the same manner as in Example 4. The pH of this magenta ink composition was measured to find that it was 8.40.

This magenta ink composition was examined on the tests (T1) to (T3), and the same good results as in Example 4 were obtained. In the evaluation of long-term stability in (T1), the pH was 8.76 after the storage at 30° C. and 8.43 at 60° C.

Example 9

To 77.93 parts by weight of pure water, 0.07 part by weight of tris(hydroxymethyl)aminomethane, 2 parts by weight of a cyan dye DAIWA IJ BLUE 319H (trade name; available from Daiwa Chemical Co., Ltd.) and 20 parts by weight of ethylene glycol were added, and a cyan ink composition was obtained in the same manner as in Example 4. The pH of this magenta ink composition was measured to find that it was 8.90.

This cyan ink composition was examined on the tests (T1) to (T3), and the same good results as in Example 4 were obtained. In the evaluation of long-term stability in (T1), the pH was 8.70 after the storage at −30° C. and 8.05 at 60° C.

Example 10

To 29.95 parts by weight of pure water, 0.05 part by weight of tris(hydroxymethyl)aminomethane, 50 parts by weight (dye concentration: 5%) of a black dye solution AMC. BFX (trade name; available from Mitsubishi Chemical Corporation; an aqueous solution with a dye concentration of 10%) and 20 parts by weight of ethylene glycol were added, and a black ink composition was obtained in the same manner as in Example 4. The pH of this magenta ink composition was measured to find that it was 8.96.

This black ink composition was examined on the tests (T1) to (T3), and the same good results as in Example 4 were obtained. In the evaluation of long-term stability in (T1), the pH was 8.80 after the storage at −30° C. and 8.30 at 60° C.

Example 11

To 71.14 parts by weight of pure water, 0.61 part by weight of tris(hydroxymethyl)aminomethane, 6.25 parts by weight of a 0.12N aqueous HCl solution, 2 parts by weight of a yellow dye DAIWA IJ YELLOW 205H (trade name; available from Daiwa Chemical Co., Ltd.) and 20 parts by weight of ethylene glycol were added, and the mixture was stirred for 30 minutes, followed by filtration with a membrane filter of 0.7 μm in pore diameter to obtain a yellow ink composition. The pH of this yellow ink composition was measured to find that it was 8.90.

This yellow ink composition was examined on the tests (T1) to (T3), and good results were obtained in all items as below.

(T1) Long-term stability: Even after such storage, deposition of insoluble matter was not seen, and changes in liquid properties (pH was 8.91 after the storage at −30° C. and 8.88 at 60° C.) and color tone were also little seen.

(T2) Ejection stability: Always stable, high-quality recording was performed in all atmospheres.

(T3) Ejection response: In both instances, no clogging occurred at the nozzles or ink channels of the ink-jet recording apparatus head, and stable and uniform recording was performed.

Example 12

To 56.56 parts by weight of pure water, 0.61 part by weight of tris(hydroxymethyl)aminomethane, 20.83 parts by weight of a 0.12N aqueous HCl solution, 2 parts by weight of a yellow dye DAIWA IJ YELLOW 205H (trade name; available from Daiwa Chemical Co., Ltd.) and 20 parts by weight of ethylene glycol were added, and a yellow ink composition was obtained in the same manner as in Example 11. The pH of this yellow ink composition was measured to find that it was 8.10.

This yellow ink composition was examined on the tests (T1) to (T3), and the same good results as in Example 11 were obtained in all items. In the evaluation of long-term stability in (T1), the pH was 8.12 after the storage at –30° C. and 8.11 at 60° C.

Example 13

To 77.37 parts by weight of pure water, 0.51 part by weight of tris(hydroxymethyl)aminomethane, 0.12 part by weight of tris(hydroxymethyl)aminomethane hydrochloride, 2 parts by weight of a yellow dye DAIWA IJ YELLOW 205H (trade name; available from Daiwa Chemical Co., Ltd.) and 20 parts by weight of ethylene glycol were added, and a yellow ink composition was obtained in the same manner as in Example 11. The pH of this yellow ink composition was measured to find that it was 8.80.

This yellow ink composition was examined on the tests (T1) to (T3), and the same good results as in Example 11 were obtained. In the evaluation of long-term stability in (T1), the pH was 8.82 after the storage at –30°C. and 8.76 at 60° C.

Comparative Example 1

To 67.7 parts by weight of pure water, 0.3 part by weight of triethanolamine, 10 parts by weight of a 0.12N aqueous HCl solution, 2 parts by weight of a yellow dye DAIWA IJ YELLOW 205H (trade name; available from Daiwa Chemical Co., Ltd.) and 20 parts by weight of ethylene glycol were added, and a yellow ink composition was obtained in the same manner as in Example 1. The pH of this yellow ink composition was measured to find that it was 7.90.

This yellow ink composition was examined on the tests (T1) to (T3). As a result, in (T1), the pH was 7.88 after the storage at –30° C. and 7.70 at 60° C., showing small changes. However, deposition of solid matter in a small quantity was seen in both instances. In respect of (T3), the ink often did not ejected. The head nozzles of the ink-jet recording apparatus were observed using an optical microscope, so that solid matter was seen to have adhered to the head nozzles.

Comparative Example 2

The procedure of Example 1 was repeated to obtain a yellow ink composition, except that the triethanolamine and 0.12N aqueous HCl solution were not used. As a result, the pH of this yellow ink composition was 5.30.

This yellow ink composition was examined on the tests (T1) to (T3). As a result, in (T1), the pH was 5.10 after the storage at –30° C. and 4.80 at 60° C., and deposition of solid matter was seen in both instances. In respect of (T2) and (T3), the ink often did not ejected. The head nozzles of the ink-jet recording apparatus were observed using an optical microscope, so that solid matter was seen to have adhered to the heas nozzles.

Comparative Example 3

To 78 parts by weight of an aqueous KOH solution prepared so as to have a concentration of $2\times10^{-5}$ mol/lit., 2 parts by weight of a yellow dye DAIWA IJ YELLOW 205H (trade name; available from Daiwa Chemical Co., Ltd.) and 20 parts by weight of ethylene glycol were added, and a yellow ink composition was obtained in the same manner as in Example 1. The pH of this yellow ink composition was measured to find that it was 8.95.

This yellow ink composition was examined on the tests (T1) to (T2). As a result, in (T1), the pH was 7.80 after the storage at –30° C. and 7.20 at 60° C., and deposition of solid matter was seen in both instances. In respect of (T2) and (T3), the ink often did not ejected. The head nozzles of the ink-jet recording apparatus were observed using an optical microscope, so that solid matter was seen to have adhered to the head nozzles.

Comparative Example 4

To 54 parts by weight of pure water, 3 parts by weight of sodium tetraborate, 21 parts by weight of a 0.12N aqueous HCl solution, 2 parts by weight of a yellow dye DAIWA IJ YELLOW 205H (trade name; available from Daiwa Chemical Co., Ltd.) and 20 parts by weight of ethylene glycol were added, and a yellow ink composition was obtained in the same manner as in Example 1. The pH of this yellow ink composition was measured to find that it was 8.80.

This yellow ink composition was examined on the tests (T1) to (T3). As a result, in (T1), the pH was 8.75 after the storage at –30° C. and 8.60 at 60° C. However, deposition of solid matter was seen after the storage at 60° C. In respect of (T2) and (T3), the ink often did not ejected. The head nozzles of the ink-jet recording apparatus were observed using an optical microscope, so that solid matter was seen to have adhered to the head nozzles.

Comparative Example 5

To 77.53 parts by weight of pure water, 0.02 part by weight of potassium dihydrogenphosphate, 0.45 part by weight of disodium hydrogenphosphate, 2 parts by weight of a yellow dye DAIWA IJ YELLOW 205H (trade name; available from Daiwa Chemical Co., Ltd.) and 20 parts by weight of ethylene glycol were added, and a yellow ink composition was obtained in the same manner as in Example 1. The pH of this yellow ink composition was measured to find that it was 8.13.

This yellow ink composition was examined on the tests (T1) to (T3). As a result, in (T1), the pH was 8.10 after the storage at –30° C. and 7.90 at 60° C., and deposition of solid matter was seen after the storage at 60° C. In respect of (T2) and (T3), the ink often did not ejected. The head nozzles of the ink-jet recording apparatus were observed using an optical microscope, so that solid matter was seen to have adhered to the head nozzles.

Comparative Example 6

To 77.51 parts by weight of pure water, 0.45 part by weight of ammonium chloride, 0.04 part by weight of a 0.1N ammonia water, 2 parts by weight of a yellow dye DAIWA IJ YELLOW 205H (trade name; available from Daiwa Chemical Co., Ltd.) and 20 parts by weight of ethylene glycol were added, and a yellow ink composition was obtained in the same manner as in Example 1. The pH of this yellow ink composition was measured to find that it was 8.86.

This yellow ink composition was examined on the tests (T1) to (T3). As a result, in (T1), the pH was 8.85 after the storage at –30° C. and 8.70 at 60° C. However, deposition of solid matter was seen after the storage at 60° C. In respect of (T2) and (T3), the ink often did not ejected. The head nozzles of the ink-jet recording apparatus were observed using an optical microscope, so that solid matter was seen to have adhered to the head nozzles.

Comparative Example 7

To 77.18 parts by weight of pure water, 0.06 part by weight of sodium carbonate, 0.76 part by weight of sodium hydrogencarbonate, 2 parts by weight of a yellow dye DAIWA IJ YELLOW 205H (trade name; available from Daiwa Chemical Co., Ltd.) and 20 parts by weight of ethylene glycol were added, and a yellow ink composition was obtained in the same manner as in Example 1. The pH of this yellow ink composition was measured to find that it was 8.87.

This yellow ink composition was examined on the tests (T1) to (T3). As a result, in (T1), the pH was 8.84 after the storage at −30° C. and 8.80 at 60° C. However, deposition of solid matter was seen and a color change was also seen after the storage at 60° C. In respect of (T2) and (T3), the ink often did not ejected. The head nozzles of the ink-jet recording apparatus were observed using an optical microscope, so that solid matter was seen to have adhered to the head nozzles.

Comparative Example 8

To 77.98 parts by weight of pure water, 0.02 part by weight of tris(hydroxymethyl)aminomethane, 2 parts by weight of a yellow dye DAIWA IJ YELLOW 205H (trade name; available from Daiwa Chemical Co., Ltd.) and 20 parts by weight of ethylene glycol were added, and a yellow ink composition was obtained in the same manner as in Example 4. The pH of this yellow ink composition was measured to find that it was 7.90.

This yellow ink composition was examined on the tests (T9) to (T3). As a result, in (T1), the pH was 7.85 after the storage at −30° C. and 7.20 at 60° C., and deposition of solid matter in a small quantity was seen in both instances. In respect of (T3), the ink often did not ejected. The head nozzles of the ink-jet recording apparatus were observed using an optical microscope, so that solid matter was seen to have adhered to the head nozzles.

Comparative Example 9

The procedure of Example 4 was repeated to obtain a yellow ink composition, except that the tris(hydroxymethyl)aminomethane was not used. As a result, the pH of this yellow ink composition was 5.30.

This yellow ink composition was examined on the tests (T1) to (T3). As a result, in (T1), the pH was 5.10 after the storage at −30° C. and 4.80 at 60° C., and deposition of solid matter was seen in both instances. In respect of (T2) and (T3), the ink often did not ejected. The head nozzles of the ink-jet recording apparatus were observed using an optical microscope, so that solid matter was seen to have adhered to the head nozzles.

Comparative Example 10

To 48.19 parts by weight of pure water, 0.61 part by weight of tris(hydroxymethyl)aminomethane, 29.2 parts by weight of a 0.12N aqueous HCl solution, 2 parts by weight of a yellow dye DAIWA IJ YELLOW 205H (trade name; available from Daiwa Chemical Co., Ltd.) and 20 parts by weight of ethylene glycol were added, and a yellow ink composition was obtained in the same manner as in Example 11. The pH of this yellow ink composition was measured to find that it was 7.72.

This yellow ink composition was examined on the tests (T1) to (T3). As a result, in (T1), the pH was 7.70 after the storage at −30° C. and 7.50 at 60° C., showing small changes. However, deposition of solid matter in a small quantity was seen in both instances. In respect of (T3), the ink often did not ejected. The head nozzles of the ink-jet recording apparatus were observed using an optical microscope, so that solid matter was seen to have adhered to the head nozzles.

Comparative Example 11

The procedure of Example 11 was repeated to obtain a yellow ink composition, except that the tris(hydroxymethyl)aminomethane and 0.12N aqueous HCl solution were not used. As a result, the pH of this yellow ink composition was 5.30.

This yellow ink composition was examined on the tests (T1) to (T3). As a result, in (T1), the pH was 5.10 after the storage at −30° C. and 4.80 at 60° C., and deposition of solid matter was seen in both instances. In respect of (T2) and (T3), the ink often did not ejected. The head nozzles of the ink-jet recording apparatus were observed using an optical microscope, so that solid matter was seen to have adhered to the head nozzles.

As been apparent from the Examples and the Comparative Examples as above, in the ink compositions of Examples 1 to 3, which showed good long-term storage stability and ejection stability and also a good ejection response, the ink compositions contained the dye, the triethanolamine and the triethanolamine hydrochloride or hydrochloric acid, and their pH were adjusted to 8 to 10 in both the cases. In the ink compositions of Examples 4 to 10, which showed good long-term storage stability and ejection stability and also a good ejection response, the ink compositions contained the dye and the tris(hydroxymethyl)aminomethane and their pH were adjusted to 8 to 10 in all the cases. In the ink compositions of Examples 11 to 13, which showed good long-term storage stability and ejection stability and also a good ejection response, the ink compositions contained the dye, the tris(hydroxymethyl)aminomethane and the tris(hydroxymethyl)aminomethane hydrochloride or hydrochloric acid and their pH were adjusted to 8 to 10 in both the cases.

On the other hand, in the ink compositions of Comparative Examples 1 to 11, which showed inferior long-term storage stability, ejection stability and ejection response, the ink composition did not fulfill the above conditions in all the cases.

What is claimed is:

1. A water-based ink composition comprising an aqueous medium, a dye dissolved therein, and a pH adjuster; wherein said pH adjuster comprises any one of the following (1) to (4):

(1) triethanolamine and triethanolamine hydrochloride;
   (2) triethanolamine and hydrochloric acid;
   (3) tris(hydroxymethyl)aminomethane and tris(hydroxymethyl)aminomethane hydrochloride; and
   (4) tris(hydroxymethyl)aminomethane and hydrochloric acid; and the pH of said water-based ink composition is adjusted to a value within the range of from 8 to 10.

2. The water-based ink composition according to claim 1, wherein said dye is contained in an amount of from 0.1% by weight to 10% by weight based on the total weight of the water-based ink composition.

3. The water-based ink composition according to claim 1, wherein said aqueous medium is a mixed solvent of water and a water-soluble organic solvent.

4. The water-based ink composition according to claim 3, wherein said water is deionized water.

5. The water-based ink composition according to claim 4, wherein said water is contained in an amount of from 10% by weight to 70% by weight based on the total weight of the water-based ink composition.

6. An ink-jet recording process carried out by jetting an ink composition to a recording medium in the form of droplets to make a record, wherein;

said ink composition comprises a water-based ink composition comprising an aqueous medium, a dye dissolved threrein, and a pH adjuster; wherein said pH adjuster comprises any one of the following (1) to (4):

(1) triethanolamine and triethanolamine hydrochloride;

(2) triethanolamine and hydrochloric acid;

(3) tris(hydroxymethyl)aminomethane and tris (hydroxymethyl)aminomethane hydrochloride; and (4) tris(hydroxymethyl)aminomethane and hydrochloric acid; and the pH of said water-based ink composition is adjusted to a value within the range of from 8 to 10.

7. The ink-jet recording process according to claim 6, wherein said ink composition is jetted in the form of droplets by utilizing the vibration of a piezoelectric device.

8. The ink-jet recording process according to claim 6, wherein said ink composition is jetted in the form of droplets by the action of heat energy.

9. The water-based ink composition according to claim 1, wherein said pH adjuster is triethanolamine and triethanolamine hydrochloride.

10. The water-based ink composition according to claim 1, wherein said pH adjuster is triethanolamine and hydrochloric acid.

11. The water-based ink composition according to claim 1, wherein said pH adjuster is tris (hydroxymethyl) aminomethane and tris (hydroxymethyl) aminomethane hydrochloride.

12. The water-based ink composition according to claim 1, wherein said pH adjuster is tris (hydroxymethyl) aminomethane and hydrochloric acid.

13. The ink-jet recording process according to claim 6, wherein said pH adjuster is triethanolamine and triethanolamine hydrochloride.

14. The ink-jet recording process according to claim 6, wherein said pH adjuster is triethanolamine and hydrochloric acid.

15. The ink-jet recording process according to claim 6, wherein said pH adjuster is tris (hydroxymethyl) aminomethane and tris (hydroxymethyl) aminomethane hydrochloride.

16. The ink-jet recording process according to claim 6, wherein said pH adjuster is tris (hydroxymethyl) aminomethane and hydrochloric acid.

* * * * *